Sept. 16, 1969    J. D. BALLENTINE    3,467,818
ELECTRICALLY HEATED WINDOW PANEL WITH THERMALLY
CONTROLLED LEAD-IN WIRES
Filed May 27, 1968

INVENTOR
JOHN D. BALLENTINE
ATTORNEYS

United States Patent Office 3,467,818
Patented Sept. 16, 1969

3,467,818
ELECTRICALLY HEATED WINDOW PANEL WITH THERMALLY CONTROLLED LEAD-IN WIRES
John D. Ballentine, Monroeville, Pa., assignor to PPG Industries, Inc., Pittsburgh, Pa., a corporation of Pennsylvania
Filed May 27, 1968, Ser. No. 732,354
Int. Cl. H05b 3/06
U.S. Cl. 219—522                     6 Claims

ABSTRACT OF THE DISCLOSURE

An electrically heated window panel having a transparent sheet coated with a plurality of elongated stripes of electroconductive material interconnecting spaced bus bars connected to a voltage source through a switch and lead-in wires that incorporates a novel system for attaching said lead-in wires to said bus bars. The lead-in wires are attached to the bus bars in such a manner as to enable the wires to expand thermally at a different rate from that of the bus bars in service without introducing strains that tend to destroy the electrical connection between the bus bars and the lead-in wires and to provide a desired heating pattern over the extent of the refractory surface.

---

Figure 1:
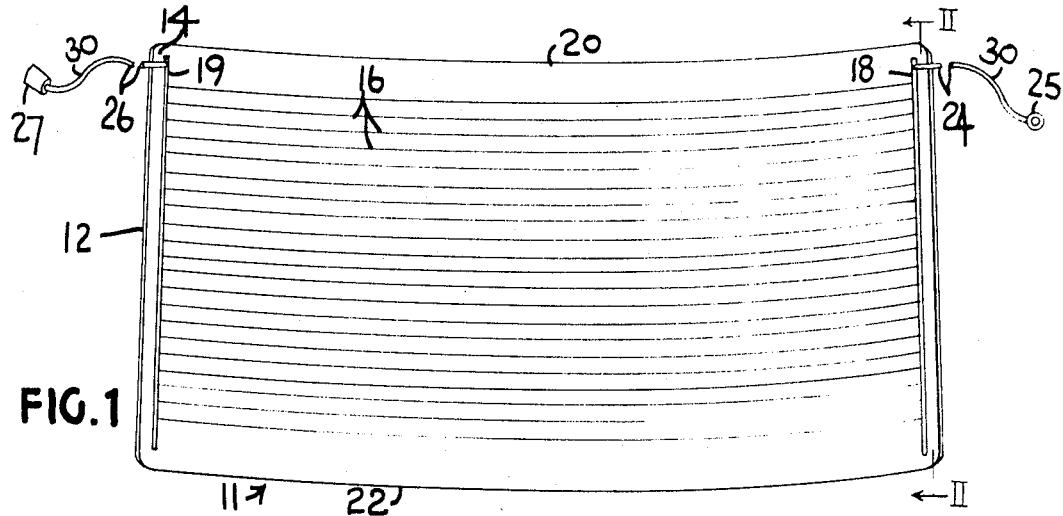

This invention relates to a heating element, and while it is particularly suitable for an automobile window, especially a tempered rear window, it also is useful as a heating element in space heaters, structural windows, and the like.

The deposit of moisture and ice on an automobile window has annoyed automobile owners considerably. Automobiles that are parked overnight are dangerous to drive until visibility is attained by removing the moisture deposit. In the past, this removal has been accomplished by applying a squeegee or scraper to the fogged surface of the window to improve the visibility through the window before moving the vehicle in traffic. Hot air blowers have also been employed to blow hot air across the surface of a fogged window. However, time is required to heat the air that is blown across the surface of the window to a temperature that is sufficient for the hot air to perform efficiently its defogging or deicing function.

In addition, the inner surface of automobile windows tend to fog whenever the windows are closed and moisture from the breath of occupants condenses on their inner surfaces. This source of fogging has also been difficult to remedy by the prior art devices described above.

Prior to the present invention, resistance wires have been embedded in or within the surface of the monolithic glass sheets or laminated glass windows to heat the window by passing electric current through the resistance wires connected between spaced bus bars. When a potential difference is applied between the bus bars, the heating wires convert the electric energy into sufficient heat energy to defog or deice the window as required.

Aircraft windows are usually coated with a transparent electroconductive coating of a metal oxide such as tin oxide or the like. This coating has a high electrical resistance requiring about 150 volts minimum potential difference to clear a window having a size comparable to that of an automobile windshield. In addition, tin oxide coatings, to be sufficiently electroconductive to function in the desired manner, are of iridescent thickness. This iridescence is annoying to an observer. Furthermore, considerable difficultly exists in obtaining suitable electrical contact between the bus bars, which are usually of a finely divided ceramic silver material, and the transparent electroconductive metal oxide film, which usually contains tin oxide and additives that enhance its electroconductivity.

Automobiles are currently provided with a twelve volt electrical energy system. Since the ceramic silver bus bar materials have so much electrical resistivity in the thicknesses at which they are applied, when they furnish sufficient electrical current to the heating wires to enable the latter to defog a clouded window in a reasonable time, the bus bar overheat. Until recently, the automobile industry has not accepted windows provided with spaced, elongated stripes of electroconductive material interconnected between bus bars mounted adjacent the opposite edges of the window and formed of the same material because of the above-described limitations of the twelve volt electrical system. However, if some way could have been found to make such a circuit practical to use, it would have been used because bus bars and stripes can be applied simultanously by a silk screening method of the type normally employed in the aircraft industry for applying ceramic silver bus bars. A typical example of such a method of application is found in U.S. Patent No. 2,648,754 to William O. Lytle.

It has been found, however, that when a lead-in wire leading to a battery terminal is connected to one of the bus bars and a grounded connection with the automotive body is connected to the other bus bar at one place only on each bus bar, that the twelve volt system is inadequate for reasons explained above to clear a window of condensed moisture in a reasonable time. Since the ceramic silver mixture used as the resistance material for the bus bars and the electroconductive stripes is an expensive material it is economically unfeasible to apply this material very thickly. In addition, the adhesion of ceramic silver to glass deteriorates when the ceramic silver layer is too thick.

It has been proposed to extend the lead-in wires, which are usually made of braided copper, over the entire length of the bus bars to provide a continuous elongated area of electrical contact between the lead-in wires and the bus bars. However, differences in thermal expansion and contraction during use develop stresses which break the contact between the lead-in wires and the bus bars.

It is impractical to use copper wire for the bus bars and the elongated resistance heating stripes because of the difficulty of adhering such material to a glass surface. It is equally impractical to use the ceramic silver as a lead-in wire, because the latter is very brittle.

The present invention solves the above dilemma by extending the lead-in wire loosely over the entire length of the bus bar and providing a plurality of spaced connections, such as solder connections, between the lead-in wires and the bus bars so that the lead-in wires extend loosely between the spaced connections to compensate for the difference in thermal expansion between each lead-in wire and its aligned bus bar resulting from changes in temperature of the window during its use, particularly when current is applied to heat a fogged window.

The present invention will be understood more clearly after the reader has an opportunity to study a description of an illustrative embodiment and certain variations thereof which follows. In the drawings which form part of the aforesaid description and wherein like reference numbers refer to like structural elements.

Figure 2:
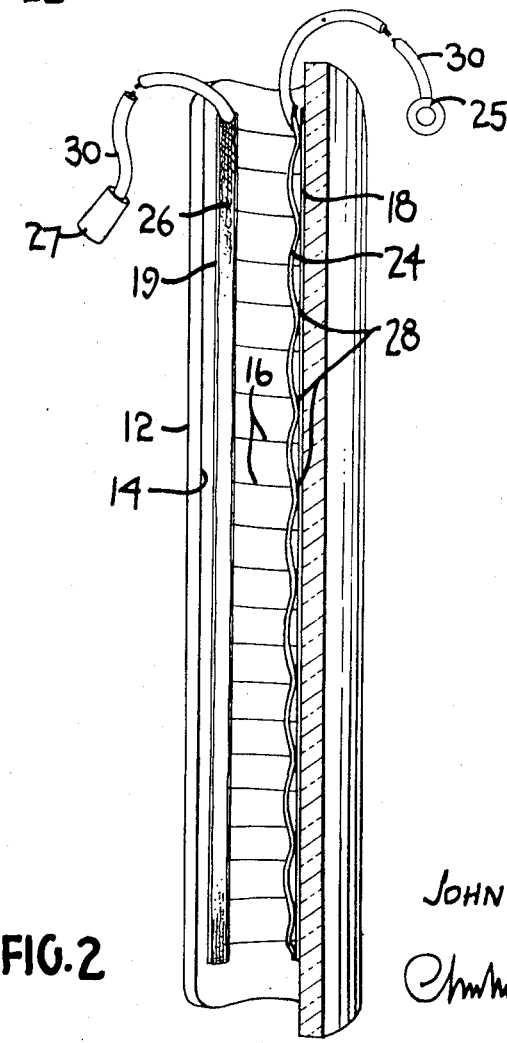

FIG. 1 is a rear view of an automobile backlight incorporating a heating element conforming to the present invention, and FIG. 2 is a sectional view taken along the lines II—II of FIG. 1.

Referring to the drawings, a curved automobile backlight 11 is shown in FIG. 1 having an outward facing surface 12 and an inward facing surface 14. A plurality of electroconductive heating elements 16 extend in substantially equally spaced relation between a pair of bus bars 18 and 19. The latter extend substantially parallel to the opposite end edges of the backlight.

In a commercially embodiment of the invention, the resistance heating elements 16 and the bus bars 18 and 19 are formed of a typical ceramic conductive coating material comprising a highly conductive metal powder such as silver and a vitrifying binder. Typical ceramic conductive coating compositions which may be used may have the following compositions:

COMPOSITION I

| Ingredient: | Percent by weight |
| --- | --- |
| PbO | 7.5 |
| $B_2O_3$ | 1.0 |
| $SiO_2$ | 1.5 |
| Flake silver | 70.0 |
| French fat oil | 12.5 |
| Turpentine | 7.5 |

COMPOSITION II

| Ingredient: | Percent by weight |
| --- | --- |
| Finely divided silver | 72.6 |
| PbO | 9.3 |
| $SiO_2$ | 1.7 |
| $B_2O_3$ | 1.4 |
| $H_2O$ | 7.5 |
| Ethyl alcohol | 7.5 |

COMPOSITION III

A typical commercial composition is a mixture containing 90 percent by weight of a ceramic silver composition sold under the trade name AB Silver by the O'Hommell Company of Carnegie, Pa., and 10 percent of a nonconducting mixture of metallic oxides sold under the trade name K736 Black by the Ferro Corporation of Cleveland, Ohio.

The electroresistant stripes 16 form narrow lines approximately $\frac{1}{32}$ inch wide and the bus bars 18 and 19 form transversely extending rows interconnecting the ends of the stripes 16 in widths of ¼ inch. The silver ceramic mixture is preferably applied through a stencil to form the stripes 16 and the bus bars 18 and 19 by a process known as "silk screening" to form a pattern .0005 inch thick.

The particular material described has an electrical resistance of 0.35 ohm per linear inch along the electroconductive stripes 16 whereas the bus bars 18 and 19 so deposited have an electrical resistance of 0.04 ohm per linear inch along their length. When the backlight to be coated with such a design is rectangular or a quadrilateral having substantially straight and parallel upper and lower longitudinal edges, the elongated electroconductive heated stripes 16 are spaced about one inch apart and are parallel to one another and straight. When the upper and lower edges of the backlight are bowed or are of different configurations from one another, automotive stylists prefer the elongated electroresistant heating stripes 16 to extend between the opposed bus bars 18 and 19 in arcuate paths, the uppermost stripe conforming in curvature substantially to the curvature of the upper longitudinal edge 20 of the backlight 11 and the lowest elongated electroconductive heated stripe conforming to the shape of its lower edge 22.

The ends of adjacent stripes 16 at their points of contact with the bus bars are spaced approximately one inch from the adjacent stripe connected to the same bus bar and the arcuate extent of the intermediate stripes is graduated from stripe to stripe to provide a gradual change from the configuration of the uppermost stripe to that of the lowest stripe. The heating pattern resulting from subjecting the opposite bus bars 18 and 19 to the potential difference of 12 volts results in a substantially uniform heating pattern throughout the entire extent of the vision area of the backlight.

To protect the heating element and bus bar from excessive exposure to atmospheric conditions, the stripes 16 and bus bars 18 and 19 are all applied to the inner surface 14 of the backlight. Under such circumstances, no protective coating has been found necessary.

The stripes 16 and the bus bars 18 and 19 are applied simultaneously through the silk screening technique described previously. The coated glass sheet is then mounted on a bending mold having an outline shaping rail of concave elevation conforming in elevation and outline but of slightly smaller area than the glass sheet after bending.

The glass laden mold is introduced into a furnace where the glass is heated to a temperature sufficient to sag the glass sheet into conformity to the mold shaping surface. During this heating, the finely divided metal ceramic frit fuses onto the glass inner surface 14 which faces upward during the bending operation. When the glass bending is completed, the glass sheet is removed from the hot atmosphere and chilled as rapidly as possible to produce a tempered glass sheet. Since the stripes 16 and the bus bars 18 and 19 have fused onto the glass surface 14 during the heating operation, they remain in the exact configuration in which they were applied to the cold glass through the stencil in the silk screening process when the glass is chilled.

A lead-in wire 24 having a terminal connection 25 adapted to attach the lead-in wire to a battery terminal is attached to bus bar 18 in a unique manner according to the teaching of the present invention. A similar lead-in wire 26 having a ground connecting terminal 27 is similarly attached to bus bar 19 in a similar manner.

Preferably, the lead-in wire is a flat copper braid of sufficient current carrying caapcity, such as the equivalent No. 14 solid copper wire, to minimize any loss of power in the bus bars which result in heated bus bars rather than the heat being dissipated throughout the extent of the stripes 16. The free ends of the lead-in wires 24 and 26 are loosely laid over the attached ceramic silver bus bar 18 or 19 and attached to its adjacent bus bar by spaced solder connections 28, preferably at about 2 inch intervals. For example, a flat tin copper braid sold as Preparation No. 1231, equivalent to No. 14 AWG, made by the Alpha Wire Corporation of Elizabeth, N.J., is soldered to the ceramic silver bus bars 18 and 19 using a tin-lead-silver solder containing 70 percent by weight of lead, 27 percent of tin and 3 percent of silver, sold by the Belmont Smelting and Refining Company of Brooklyn, N.Y. as No. 5701 solder. A suitable flux for the solder is sold under the trade name Nokorode solder paste made by the M. W. Dunton Company of Providence, R.I.

The multiple attachments of the lead-in wires to each of the bus bars reduces the length of the current path through any part of the bus bar to a reasonable distance which does not cause undue loss of electrical energy to heat the bus bars. The looseness of the attachment of the lead-in wires to the bus bars permits the lead-in wires to extend loosely between the spaced connections 28. At the same time, only the portions of lead-in wires 24 and 26 that are not disposed over the bus bars 18 and 19 are covered with insulation 30. This increases the area of contact between the lead-in wires 24 and 26 and the bus bars 18 and 19 to reduce the heat loss in the bus bars even further, thus enabling the heating elements 16 to provide as large a proportion of the total resistance of the heating circuit as possible.

The form of the invention shown and described above represents an illustrative preferred embodiment and certain modifications thereof. It is understood that various changes may be made without departing from the spirit of the invention as defined in the claimed subject matter that follows.

What is claimed is:

1. In a window having a transparent sheet coated with a plurality of elongated stripes of electroconductive material having a predetermined electrical resistance per unit length interconnecting a pair of bus bars, each of the latter having a lower electrical resistance per unit length than that of said elongated stripes, at least one lead-in wire for each said bus bar having a lower resistance per unit length and a different coefficient of thermal expansion than said bus bar coupled to the latter, voltage supply means adapted to be coupled to said bus bars through said lead-in wires to heat said elongated stripes sufficiently to defog said window when said voltage supply means supplies a potential difference between said bus bars, the improvement comprising each of said lead-in wires being loosely aligned along a substantial portion of the length of one or another of said bus bars and a plurality of spaced connections between each of said lead-in wires and said bus bar in alignment with said lead-in wire, said lead-in wire extending loosely between said spaced connections to compensate for the difference in thermal expansion between said lead-in wire and said aligned bus bar resulting from changes in temperature of said window during its use.

2. The improvement as in claim 1, wherein said elongated stripes are relatively thin and said bus bars are relatively wide and of substantially the same thickness and material as said stripes.

3. The improvement as in claim 2, wherein said stripes and bus bars are of electroconductive ceramic silver.

4. The improvement as in claim 3 wherein said lead-in wire is composed of copper.

5. The improvement as in claim 4, wherein each of said connections is composed of a tin-lead-silver solder.

6. The improvement as in claim 1, wherein said transparent sheet in glass.

References Cited
UNITED STATES PATENTS

| | | | |
|---|---|---|---|
| 2,526,327 | 10/1950 | Carlson | 219—203 X |
| 2,795,682 | 6/1957 | Knoll | 219—345 |
| 3,288,983 | 11/1966 | Lear | 219—522 |
| 3,379,859 | 4/1968 | Marriott | 219—522 |

VOLODYMYR Y. MAYEWSKY, Primary Examiner

U.S. Cl. X.R.

219—203, 543; 338—309